(12) United States Patent
Tuulari et al.

(10) Patent No.: US 8,387,470 B2
(45) Date of Patent: Mar. 5, 2013

(54) PEDALLING MEASUREMENT

(75) Inventors: Esa Tuulari, Kempele (FI); Risto Nousiainen, Pyhäsalmi (FI); Klaus Känsälä, Ii (FI)

(73) Assignee: Polar Electro Oy, Kempele (FI)

( * ) Notice: Subject to any disclaimer, the term of this patent is extended or adjusted under 35 U.S.C. 154(b) by 279 days.

(21) Appl. No.: 12/858,832

(22) Filed: Aug. 18, 2010

(65) Prior Publication Data
US 2011/0041626 A1 Feb. 24, 2011

(30) Foreign Application Priority Data
Aug. 24, 2009 (FI) .................................. 20095868

(51) Int. Cl.
*G01L 1/12* (2006.01)
(52) U.S. Cl. .................................. 73/862.627
(58) Field of Classification Search ............ 73/760, 73/862.08, 862.627
See application file for complete search history.

(56) References Cited

U.S. PATENT DOCUMENTS

| | | | |
|---|---|---|---|
| 5,411,448 A * | 5/1995 | Horii et al. ............ 477/102 |
| 6,105,737 A * | 8/2000 | Weigert et al. ........... 188/158 |
| 6,453,768 B2 * | 9/2002 | Wehner et al. ............ 74/512 |
| 7,599,806 B2 * | 10/2009 | Hauschildt ............... 702/44 |
| 8,011,242 B2 * | 9/2011 | O'Neill et al. ........ 73/379.01 |
| 8,038,229 B2 * | 10/2011 | Leiber et al. ............ 303/115.2 |
| 8,150,587 B2 * | 4/2012 | Tomoda et al. ............ 701/64 |

FOREIGN PATENT DOCUMENTS

| | | |
|---|---|---|
| DE | 10007841 A1 | 9/2001 |
| FR | 2724728 A1 | 3/1996 |
| WO | WO2009/006673 A1 | 1/2009 |

OTHER PUBLICATIONS

Kenneth Gustafsson, Finnish Search Report for corresponding Finnish Application No. FI20095868, p. 1 (Feb. 2, 2010).

* cited by examiner

*Primary Examiner* — Max Noori
(74) *Attorney, Agent, or Firm* — Hoffmann & Baron, LLP (57) ABSTRACT

Apparatus and method for pedalling measurement are presented. The apparatus comprises: a portion to form a hole for accommodating a spindle of a pedal; a strain member to undergo deformation by a force applied on the pedal and transmitted by means of the spindle through the portion to the strain member; and a strain gauge, coupled with the strain member, to measure an elastic strain representing the deformation.

23 Claims, 6 Drawing Sheets

PEDALLING MEASUREMENT

CROSS-REFERENCE TO RELATED APPLICATION

This application claims priority based on Finnish Patent Application No. 20095868, filed Aug. 24, 2009, which is incorporated herein by reference in its entirety.

BACKGROUND

1. Field

The invention relates to an apparatus and a method for pedalling measurement.

2. Description of the Related Art

Pedalling measurement refers to measuring various parameters from pedalling action. The measurement may be utilized in various products relating to sports, exercise, medicine, or bicycles, for example.

SUMMARY

The present invention seeks to provide an improved apparatus and an improved method.

According to an aspect of the present invention, there is provided an apparatus as specified in claim 1.

According to another aspect of the present invention, there is provided another apparatus as specified in claim 16.

According to another aspect of the present invention, there is provided a method as specified in claim 17.

BRIEF DESCRIPTION OF THE DRAWINGS

Embodiments of the present invention are described below, by way of example only, with reference to the accompanying drawings, in which FIGS. 1, 3, 4A, 4B, 5 and 8 illustrate various embodiments of an apparatus, wherein

DETAILED DESCRIPTION

The following embodiments are exemplary. Although the specification may refer to "an" embodiment in several locations, this does not necessarily mean that each such reference is to the same embodiment(s), or that the feature only applies to a single embodiment. Single features of different embodiments may also be combined to provide other embodiments.

With reference to FIGS. 1, 3, 4A, 4B, 5 and 8, various embodiments of an apparatus 112 are described.

The basic structure of the apparatus 112 is described with reference to FIGS. 3 and 4A. The apparatus 112 comprises a portion 406 to form a hole 304 for accommodating a spindle 230 of a pedal 208. The portion 406 may be implemented by any suitable means for securely fixing the spindle 230. The portion 406 may belong to a body 422, and the hole may have been machined or cast into the body 422, i.e. the portion 406 forms the rim of the hole 304. In a certain sense, the portion 406 may be a part of the body 422, either separated from or integrated with it. The portion 406 may be provided with threads, and the spindle 230 may have corresponding threads, whereby the spindle 230 may be screwed into the threads formed into the inner wall of the hole 304. Other suitable means to fix the spindle 230 into the hole 304 may be by welding, by a locking pin, or the spindle 230 and the portion 406 may even be glued together. In any case, the fixing is to be performed in such a manner that it is able to endure the forces received by the pedal 208. Besides the portion 406 being an integral part of the body 422, the portion 406 may also be a separate piece: the portion 406 may be a collar, for example. The collar 406 may have threads within its inner wall.

'Pedal' normally refers to a component of a bicycle drivetrain, which converts the reciprocating motion of the rider's legs into rotational motion used to drive a chain (or even a belt or some other force transmission means), which in turn drives a wheel of the bicycle. However, within this patent application, besides referring to foot pedals, 'pedal' also refers to hand pedals as the apparatus is equally capable of measuring action by hand pedals. Furthermore, besides bicycle, the pedal 208 may belong to any human-powered vehicle, such as a unicycle, a tricycle, a quadricycle, a recumbent, a stationary exercise-bike, pedelecs (pedal electric bikes) etc.

Figure 1:
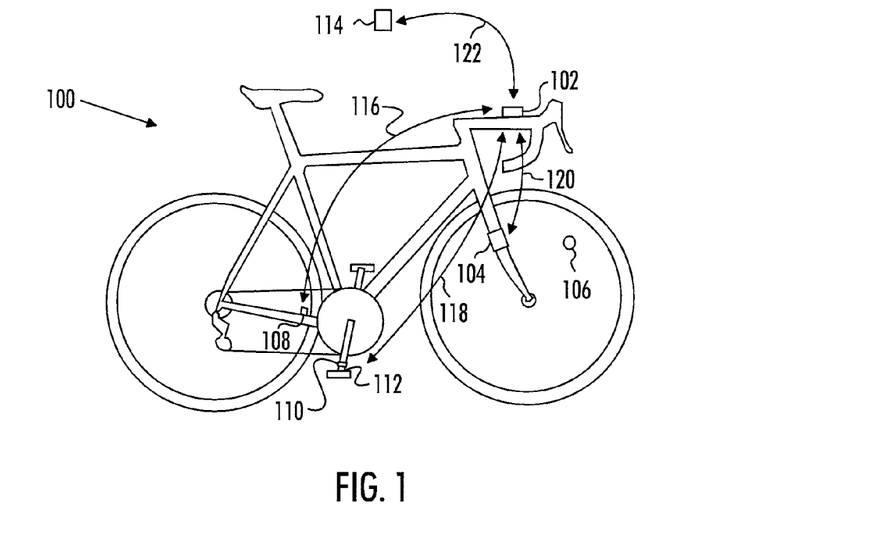
FIG. 1 illustrates an embodiment of the apparatus in connection with a cycling computer system.

The pedal 208 may be mounted on a crank 206. There are two cranks 206, one on each side of a crankset, usually mounted 180° out of phase. The crankset comprises, besides the two cranks 206, one or more sprockets (also known as chainrings or chainwheels). The crankset connects to the rider by the pedals 208, to the bicycle frame by the bottom bracket, and to the rear sprocket via the chain, as illustrated in FIG. 1. As shown in FIG. 3, the (right) crank 206 may comprise a crank spindle hole 300 hereby the crank 206 is attachable to a bottom bracket spindle.

The apparatus 112 also comprises a strain member 416 to undergo deformation by a force applied on the pedal 208 and transmitted by means of the spindle 230 through the portion 406 to the strain member 416. The strain member 416 may be machined into the body 422. As illustrated in FIG. 4A, the portion 406 may be machined into the body 422, and the strain member 416 may be machined into the body 422 in such a manner that the force applied on the pedal 208 is transmitted from the portion 406 into the surrounding strain member 416. Alternatively, the strain member 416 may be a separate piece, or it may form a single piece together with the portion 406, i.e. the strain member 416 may be integrated into the body 422, and/or the portion 406 may be integrated into the strain member 416.

If all three, the portion 406, the strain member 416, and the body 422, belong to a single piece, they may have been machined from a single piece of raw material, or they may have been cast from molten raw material. Also hot or cold forging may be used in the manufacture process. The raw material from which the portion 416, the strain member 416 and the body 422 are manufactured may be the same for all three, or, alternatively, a suitable raw material may be individually selected for each of these components. The material may be a suitable metal or some composite material, for example. Aluminium alloy, titanium, carbon fibre, steel (such as chromoly steel), may be used, for example.

The apparatus 112 also comprises a strain gauge 408A, 408B, 408C, coupled with the strain member 416, to measure an elastic strain representing the deformation. The coupling between the strain gauge 408A, 408B, 408C and the strain member 416 may be implemented by any suitable means, as long as the deformation experienced by the strain member 416 may be passed on to and measured by the strain gauge 408A, 408B, 408C. One suitable way of implementing the coupling is by a suitable adhesive. The strain gauge 408A, 408B, 408C may be glued onto the flat surface of the strain member 416, for example. Cyanoacrylate, for example, may be used as the adhesive, or any other adhesive that ensures a suitably durable bonding.

The strain gauge 408A, 408B, 408C is a device with which a strain of an object may be measured. It may have an insulating flexible backing which supports a metallic foil pattern. As the object whereto the strain gauge 408A, 408B, 408C is attached is deformed, the foil is also deformed, causing a change in the electrical resistance of the foil. The resistance change may be measured, by a Wheatstone bridge, for example. The resistance change is related to the strain by the quantity known as the gauge factor. It is to be noted that even if FIG. 4A shows three strain gauges 408A, 408B, 408C, this is not a required number: there may be one strain gauge only, two strain gauges, or even a plurality of strain gauges, depending on the measuring geometry and/or desired measuring accuracy. As shown in FIG. 4A, the strain gauge 408A, 408B, 408C may be a rectangular strip, and it may deform by stretching, whereby its foil becomes narrower and longer, or by compressing, whereby its foil becomes broader and shorter.

In continuum mechanics, deformation is the change in shape and/or size of a continuum body after it undergoes a displacement between an initial (undeformed) configuration and a current (deformed) configuration.

The displacement of a continuum body consists of two components: a rigid-body displacement component and a deformation component. If there is a relative displacement between particles after a displacement of the continuum, a deformation has occurred. The rigid-body displacement characterizes the displacement of the entire body and is not relevant from the point of view of a strain measurement.

Strain is the geometrical measure of deformation representing the relative displacement between particles in the material body. In other words, strain is a measure of how much a given displacement differs locally from a rigid-body displacement.

Deformations result from stresses within the continuum body induced either by external forces or due to changes in temperature of the continuum body. The relation between stresses and induced strains may be expressed by constitutive equations, such as Hooke's law for linear elastic materials, for example.

Deformations which are recovered after the external forces have ceased, may be called elastic deformations. The continuum completely recovers its original configuration, if the deformation is elastic. Irreversible deformations, which remain even after external forces have ceased, may be called plastic deformations. Such deformations occur in material bodies after stresses have surpassed a certain threshold value known as the elastic limit or yield stress. The plastic deformations may be the result of slip, or dislocation mechanisms at the atomic level.

The strain member 416 may be designed and dimensioned in such a manner that the forces generated by the pedalling action cause an elastic deformation. A plastic deformation is undesirable, and the strain member (as well as the portion 406 and the body 422) may be dimensioned with a suitable safety margin in order to prevent it. Consequently, the strain gauge 408A, 408B, 408C measures the elastic strain representing the elastic deformation.

In an embodiment, the strain gauge 408A, 408B, 408C may be configured to measure the elastic strain in a direction 312 radial to the hole 304. The radial direction 312 may in principle be any position in the 360° circle around the hole 304. In another word, radial direction refers to a direction of a line directed along an extended radius of the hole 304. As shown in FIG. 4A, the radial directions of the three strain gauges 408A, 408B, 408C are separated by 120° each, but this is merely an exemplary configuration, the actual measurement geometry determines the suitable positioning of the strain gauge(s) 408A, 408B, 408C.

Figure 2:
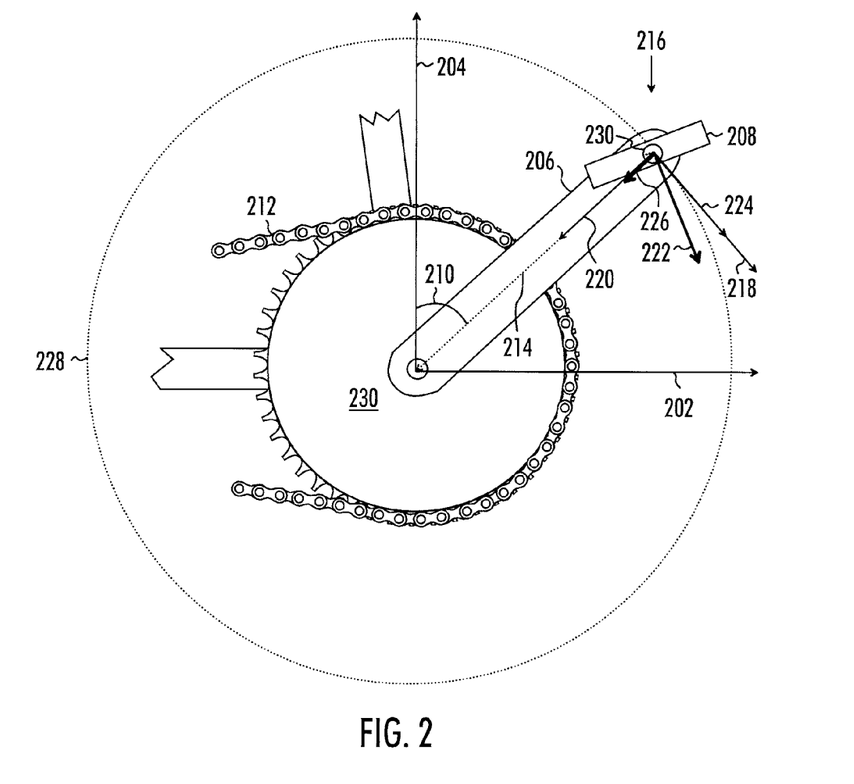
FIG. 2 illustrates pedalling dynamics scheme and measurement geometry.

FIG. 2 illustrates pedalling dynamics scheme and measurement geometry.

There are two separate coordinate systems: a bike-fixed coordinate system, and a crank-fixed coordinate system 216. The x axis 202 and y axis 204 determine the bike-fixed coordinate system. The crank-fixed coordinate system 216 is determined by a tangential axis 218 and a radial axis 220.

While pedalling, the pedal 208 travels along a pedalling trajectory 228. At any given time, an instantaneous crank angle 210 has a value between 0 and 360 degrees. As the cranks 206 (note that the other crank is not shown in FIG. 2 in order to improve clarity) are rotated, a sprocket 230 rotates a chain 212, which, in turn, rotates another sprocket and a drive wheel connected to the other sprocket, whereby the force generated by the pedalling action is transmitted to the drive wheel.

When the person's foot presses the pedal 208 to the direction of an instantaneous pedalling force vector 222, the force can be divided into a tangential pedalling force vector 224 and a radial pedalling force vector 226. However, when considering the pedalling power transmitted to the chain 212, the tangential direction 224 only matters. An instantaneous pedalling power $P_{i,out}$ may be obtained from equation $$P_{i,out} = F_{i,tan} \times v_{circ,i} = F_{i,tan} \times \omega_i \times r_{crank}, \quad (1)$$

wherein $F_{i,tan}$=instantaneous pedalling force,
$v_{circ,i}$=instantaneous circumferential velocity of the pedal,
$\omega_i$=angular speed of the crank, and
$r_{crank}$=crank arm length 214, i.e. separation between the rotation axis of the crank and the pedal spindle.

Considering the measurement geometry, it is advisable to carefully plan the dimensioning and positioning of the portion 406 and the strain member 416 in relation to the body of the apparatus 422 and the crank 206. Indeed, in an embodiment illustrated in FIG. 4A, the strain member 416 is force dynamics symmetric with respect to an axis 420 of the hole 304, and/or a plane along the diameter of the hole 304. The hole axis 420 points to the direction of the pedal spindle 230 when the pedal 208 is attached to the apparatus 112. The force dynamics symmetry results in uniform strain behaviour of the measurement arrangement regardless of the instantaneous crank angle 210 and/or pedalling angle, thus allowing to process strain information with relatively simple algorithms.

In an embodiment, the apparatus comprises a body 422, and the strain member 416 comprises a strain strip 418A, 418B, 418C, extending from the vicinity of the portion 406 to the vicinity of the body 422, to receive at least a part of the force and to undergo deformation by the force. As shown in FIG. 4A, the strain gauge 408A, 408B, 408C is coupled with the strain strip 418A, 418B, 418C of the strain member 416. Although FIG. 4A shows three strain strips 418A, 418B, 418C, their number may vary from one to a plurality.

Figure 4A:
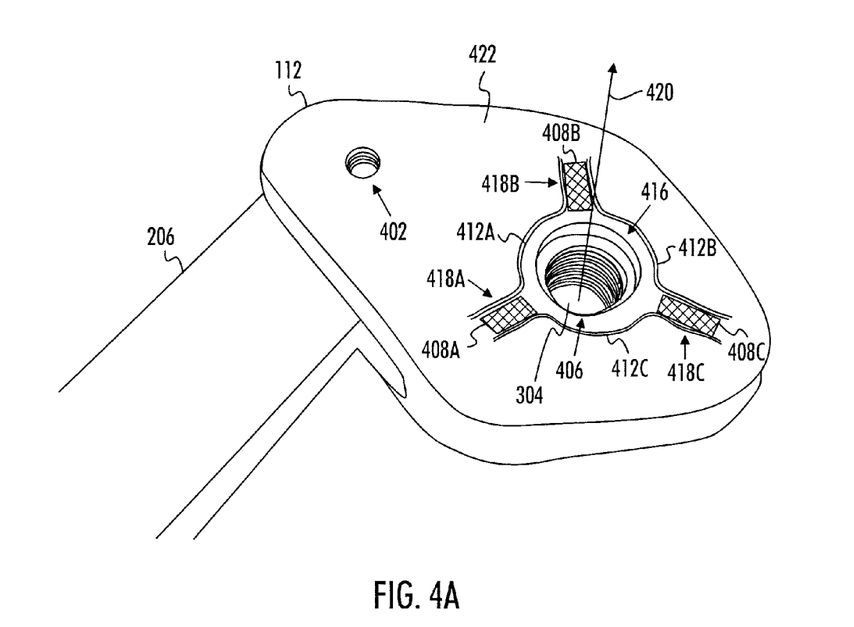

As shown in FIG. 4A, the strain strip 418A, 418B, 418C may comprise an elongated structure radially extending from the vicinity of the portion 406 to the vicinity of the body 422. The strain strip 418A, 418B, 418C may be partly separated from the rest of the strain member 416 by weakening structures 412A, 412B, 412C. The weakening structures 412A, 412B, 412C may be formed during the manufacture of the apparatus 112 by cutting the strain strip 418A, 418B, 418C apart from the strain member 416 except for a neck connecting the strain strip 418A, 418B, 418C to the rest of the strain member 416. The weakening structure 412A, 412B, 418C may also be formed into the mould used for casting the strain member 416 or the body 422. Any other suitable method for forming the weakening structure 412A, 412B, 412C may be used as well. The strain strip 418A, 418B, 418C may also be separated only partly from the rest of the strain member 416 by grooves. The strain strip 418A, 418B, 41C is typically designed such that the deformation of the strip is at the dynamic measurement scale of the strain gauge 408A, 408B, 408C and fulfils other criteria, such as mechanical stress tolerance, associated with pedalling forces. The design includes selecting the material, and adjusting shape and dimensions, such as thickness, length and width, of the strain strip 418A, 418B, 418C.

If the strain member 416 and the body 422 are formed from the same material piece, the partly separation between the strain member 416 and the body 422 may be realized by a partial gap or groove between the strain member 416 and the body 422.

The function of the strain strips 418A, 418B, 418C may be to direct the forces caused by the pedalling action in order to simplify the measurement geometry. The measurement accuracy may also be improved.

Even though the strain member 416 may comprise a plurality of strain strips 418A, 418B, 418C, not all of them need to be used for measurement. Consequently, at least one strain strip 418A, 418B, 418C may be a dummy strain strip without a coupled strain gauge 408A, 408B, 408C. The dummy strain strip preserves the force dynamics symmetry described above.

If the apparatus 112 comprises a plurality of strain strips 418A, 418B, 418C, and a plurality of strain gauges 408A, 408B, 408C, a processor 310 may be configured to form a pedalling parameter from the elastic strains measured by the plurality of the strain gauges 408A, 408B, 408C. The accuracy and reliability of the apparatus 112 may be improved with such an arrangement. The strain strips 418A, 418B, 418C may be positioned in a known configuration with respect to an axis 420 of the hole 304, and the processor 310 may be configured to form a pedalling parameter based on the known configuration and the elastic strains. The known configuration comprises the angular position, direction and mechanical dimensions of the strain strips 418A, 418B, 418C and those of the strain gauges 408A, 408B, 408C. The known configuration may further comprise strain gauge characteristics such as sensitivity and thermal characteristics.

In summary, the apparatus 112 is attachable to a crank 206, the apparatus is a part of a crank 206, two apparatuses 112 are attachable to each crank 206 of a crankset, two apparatuses 112 are each part of a crank 206 of a crankset, the apparatus 112 is a part for a bicycle, the apparatus 112 is a bicycle, or the apparatus 112 is any component or part of it capable of receiving force transmitted from the pedal 208 by its spindle 230.

Figure 3:
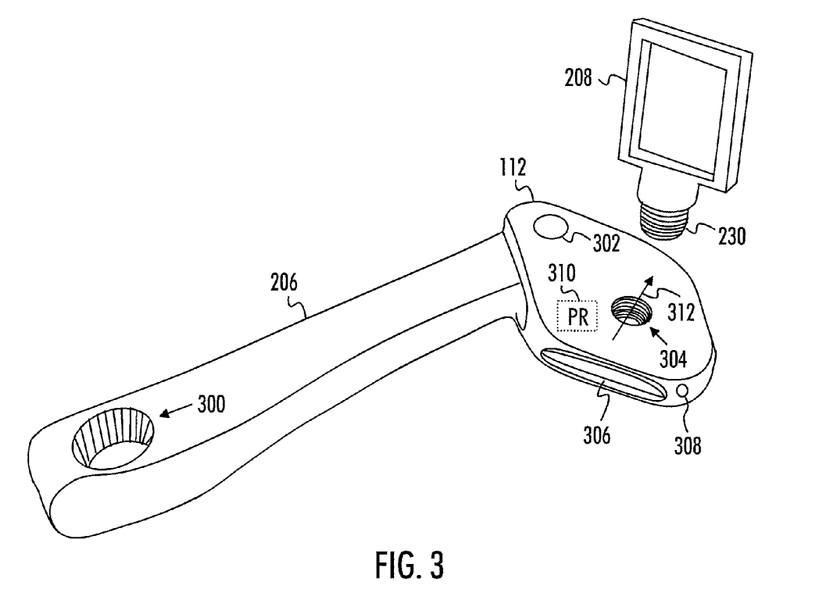
FIGS. 3, 4A, and 4B illustrate an embodiment wherein the apparatus is implemented as a separate unit.
Figure 4B:
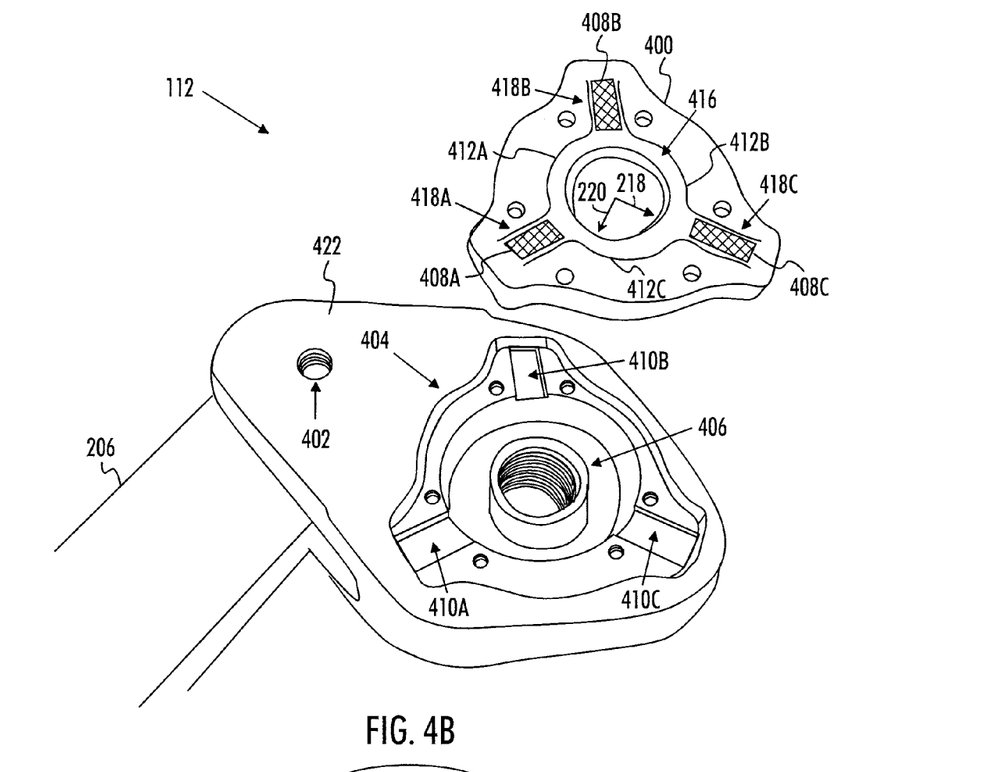

FIGS. 3 and 4A (and 4B) illustrate an embodiment wherein the apparatus 112 is implemented as a separate unit. The apparatus 112 may be attachable to (and detachable from) a standard crank 206. There may thus be an attachment hole 402 in the apparatus 112. This attachment hole 402 may match with the actual pedal spindle hole of the crank 206, whereby the crank 206 and the apparatus 112 may be fixed to each other by a suitable attachment member 302. The attachment hole 402 may be threaded, and it may have the same diameter as the actual pedal spindle hole of the crank 206. The attachment member 302 may be a threaded bolt screwed through the attachment hole 402 into the actual pedal spindle hole of the crank 206. The threaded bolt 302 spreads against the inner surface of the spindle hole of the crank 206. Other suitable means to fix the apparatus 112 to the crank 206 may be used as well.

The apparatus 112 may be designed such that the threaded spindle hole 304 rotates along the same trajectory 228 as the spindle hole of the crank does so that both the pedalling geometry and the effective crank length remain the same as in the case where the apparatus 112 is not installed in the crank 206.

FIG. 1 illustrates an embodiment where the apparatus 112 co-operates with a cycling computer system 100. At the time of filing this patent application, such a cycling computer system 100 may be implemented based on a Polar CS600 with a power sensor, for example. The implementation of the embodiments in such an existing product requires relatively small and well-defined modifications. Naturally, as the products evolve, feasible platforms for the implementation of the embodiments described in this patent application also evolve and emerge.

The system 100 may comprise a handlebar-mounted central unit 102. The central unit 102 may be a bike computer, a mobile phone, or a wrist computer, for example. The user interface run in the central unit 102 may show various cycling-related parameters, such as elapsed time, speed, distance, elevation, cadence, route information etc. The user interface may comprise a display, means for producing sound, a keyboard, and/or a keypad. The display may be a liquid crystal display, for example, but it may also be implemented by any appropriate technique. The means for producing sound may be a loudspeaker or a simpler means for producing beeps or other sound signals. The keyboard/keypad comprises a complete qwerty keyboard, a mere numeric keypad or only a few push buttons and/or rotary buttons. In addition, the user interface may comprise other prior art user interface elements, for example various means for focusing a cursor (mouse, track ball, various arrow keys, etc.) or elements enabling audio control.

Furthermore, the central unit 102 may output information relating to the measured elastic strain. The measured elastic strain may be transformed into pedalling action information, such as information on pedalling power, pedalling efficiency, left/right (crank) balance, and pedalling index. The outputted information may also relate to some other pedalling parameter, such as a scalar pedalling force, a tangential pedalling force, a radial pedalling force, a pedalling force distribution along pedalling angle, a maximum force, an average force etc. The apparatus 112 may transmit the measured elastic strain data, or further refined pedalling effort signal, using a wireless connection 118 to the central unit 102.

As shown in FIG. 3, the apparatus 112 may comprise a wireless transmitter 306 for transmitting the information to the central unit 102. The transmitter 306 may operate according to a suitable proximity communication, i.e. with a communication technology that takes place over relatively small distances. A suitable range may vary from 0.5 to 1.5 meters. Longer ranges (such as ten meters) may also be applied. The range may be such that it encompasses typical communication path lengths within a bicycle. The proximity communication may be implemented with an induction-based technology utilizing a magnetic field, or a radio-based technology utilizing electric radiation, for example. It is to be noted that both technologies involve both the magnetic field and the electric radiation, but the separation is based on the fact that either one of these physical phenomena predominates and is used for communication in each technology. The induction-based transmission may operate at a kilohertz range frequency (5 kilohertz, 125 kilohertz, or over 200 kilohertz, for example). The radio transmission may utilize a proprietary transceiver (operating at a 2.4 gigahertz frequency, for example), or a Bluetooth transceiver, for example. Emerging ultra low power Bluetooth technology may also be used. Other suitable proximity communication techniques may include techniques based on light or sound, such as infrared communication or sonic communication. The proximity communication may utilize any suitable protocols: the principles of time division and/or packet transmission, for example. The transmitter 306 may be an induction-based transmitter, such as a kilohertz-range transmitter, a passive radio-frequency identification tag, a coil-based inductive communication unit, or a near field communication transmitter, for example. The radio transmission may also operate according to some WLAN (Wireless Local Area Network) standard.

Additionally, or alternatively, the apparatus 112 may comprise a processor 310 configured to form a pedalling parameter by using the elastic strain. The term 'processor' refers to a device that is capable of processing data. The processor 310 may comprise an electronic circuit implementing the required functionality, and/or a microprocessor running a computer program implementing the required functionality. When designing the implementation, a person skilled in the art will consider the requirements set for the size and power consumption of the apparatus, the necessary processing capacity, production costs, and production volumes, for example.

The electronic circuit may comprise logic components, standard integrated circuits, application-specific integrated circuits (ASIC), and/or other suitable electronic structures.

The microprocessor implements functions of a central processing unit (CPU) on an integrated circuit. The CPU is a logic machine executing a computer program, which comprises program instructions. The program instructions may be coded as a computer program using a programming language, which may be a high-level programming language, such as C, or Java, or a low-level programming language, such as a machine language or assembly language. The CPU may comprise a set of registers, an arithmetic logic unit (ALU), and a control unit. The control unit is controlled by a sequence of program instructions transferred to the CPU from a program memory. The control unit may contain a number of microinstructions for basic operations. The implementation of the microinstructions may vary, depending on the CPU design. The microprocessor may also have an operating system (a dedicated operating system of an embedded system, or a real-time operating system), which may provide the computer program with system services.

The apparatus 112 may also comprise an output device for outputting the pedalling parameter. Besides the wireless transmitter 306, the output device may be a device interface (with which another apparatus may interact by exchanging data with the apparatus 112), a display, or some other means to visually (or even in another manner such as by sound) output data. The other means to visually output data may be a LED (Light Emitting Diode) 308 or the like, and the visual output may be expressed by the colour of the LED 308 (there may be more than one LED, each having own colour) or the blinking frequency of the LED 308, for example.

The system 100 may also comprise a speed measuring unit 104, 106. The speed measuring unit may comprise two parts, a speed detector 104, and a speed inductor 106. This may be implemented in such a manner that a wheel speed sensor 104 is placed on the right fork, and a wheel speed magnet 106 is placed on a spoke (for the sake of clarity, spokes are not illustrated in FIG. 1). Speed information is obtained from the wheel speed sensor 104 as the wheel speed magnet 106 passes it. The speed detector 104 may transmit the wireless speed signal 120 to the central unit 102.

The system 100 may also comprise a cadence measuring system 108, 110. The cadence measuring system 100 may comprise two parts, a cadence detector 108, and a cadence inductor 110. This may be implemented in such a manner that a cadence magnet 110 is placed on the right crank, and the crank speed detector 108 is mounted on the right chain stay. Cadence information is obtained from crank speed detector 108 as the cadence magnet 110 passes it. The cadence detector 108 may transmit the wireless cadence signal 116 to the central unit 102.

In an embodiment, the cadence measuring system is implemented with at least one accelerometer attached to the crank 206. The at least one accelerometer may be integrated into the transmitter 306, for example.

The system 100 may also comprise a heart activity measurement unit 114. The heart activity measurement unit 114 may be strapped around the chest of the cyclist, for example. The heart activity measurement unit 114 may produce heart activity information, such as a heart rate. The heart activity measurement unit 114 may transmit the wireless heart activity signal 122 to the central unit 102.

FIG. 4B illustrates another embodiment wherein the apparatus 112 is implemented as a separate unit. Furthermore, FIG. 4B illustrates one-sided measurement. Besides the body 422, the apparatus 112 comprises a measurement member 400 which is pressed into a measurement compartment 404 formed into the body 422 and having matching physical dimensions.

If the strain gauges 408A, 408B, 408C are positioned in that side of the measurement member 400 that goes first into the measurement compartment 404, the measurement compartment 404 may comprise strain gauge compartments 410A, 410B, 410C The cylinder-like structure of the portion 406, i.e. a support element, is tightly surrounded by the hole in the middle of the measurement member 400. Thus, when the pedalling force is directed via the spindle 230, the spindle 230 deforms the support element 406 which, in turn, deforms the strain member 416. Thus, the support element 406 acts as a force transmission element and also provides a support for the spindle 230 in the non-measurement side (=the opposite side of the body 422, i.e. the side of the body 422 whereto the measurement member 400 is not pressed) of the apparatus 112. The deformation is measured with the strain gauges 408A, 408B, 408C attached to the strain member 416. The signals from the strain gauges 408A, 408B, 408C are fed into a processor or an output device. Note that FIG. 4B also shows the tangential axis 218 and the radial axis 220 of the crank-fixed coordinate system 216 as illustrated in FIG. 2.

In an embodiment, illustrated as well in FIG. 4B, the apparatus 112 comprises the body 422, and the portion 406 is supported from a first axial position of the hole 304 to the body 422, and the strain member 416 is supported from a second axial position of the hole 304 to the body 422. This is implemented in FIG. 4B in such a manner that the portion 406 is fixed from its bottom to the body 422, and the strain member 416 is supported by the walls of the measurement member compartment 404 when being in place in the measurement member compartment 404. Naturally, such a support from two axial positions of the hole 304 may be implemented in a one piece apparatus (illustrated in FIG. 4A) 112, or in a three piece apparatus (illustrated in FIG. 8) 112, the embodiment being implementable in an apparatus 112 integrated into the crank 206 as well.

Figure 7:
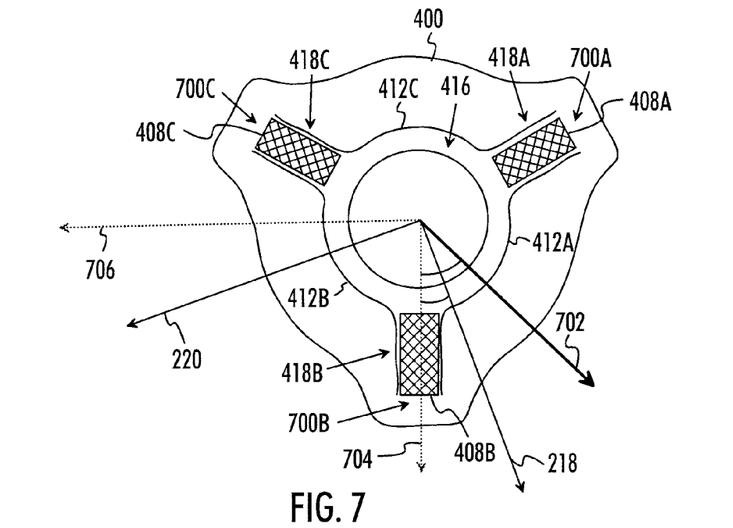
FIG. 7 illustrates measurement geometry of a measurement member.

More details on the measurement member 400 are provided in FIG. 7. FIG. 7 also illustrates measurement geometry of the measurement member 400. The strain strips 418A, 418B, 418C are separated from the rest of the strain member 416 by weakening grooves 412A, 412B, 412C, which allow the strain member 416 to change its shape and deform according to the force transmitted by the spindle 230. The strain member 416 is fixed to the measurement member 400 in fixing areas 700A, 700B, 700C.

FIG. 7 shows the crank-fixed x coordinate axis 220 and y axis 218 as well as the measurement member-fixed x axis 706 and y axis 704. An instantaneous pedalling force is represented by vector 702.

In an embodiment, the simplest measurement is provided with a solution with a single measurement branch. A measurement branch comprises a strain gauge 408A, 408B, 408C and according to an embodiment a strain strip 418A, 418B, 418C. Let us suppose that the branch is that with strain gauge 408B. In such a case, branches 408A and 408C can be removed from the consideration.

In another embodiment, in a multi-branch measurement, a plurality of strain gauges 408A, 408B, 408C is used. A force in desired direction may be calculated as a linear combination of the strain gauge readings as $$F_{i,dir} = a_{dir} \times F_{i,a} + b_{dir} \times F_{i,b} + c_{dir} \times F_{i,c}, \quad (2)$$

wherein $F_{i,dir}$=an instantaneous force in a desired direction, i.e. radial or tangential, $F_{i,a}$, $F_{i,b}$, $F_{i,c}$=instantaneous force reading from each strain gauge, and $a_{dir}$, $b_{dir}$, $c_{dir}$=weight coefficients which depend on the measurement As a simplification FIG. 7, we assume that the angular separation of the strain gauges 408A, 408B, 408C is 120 degrees, and their distance from centre of the hole axis is same for all strain gauges_408A, 408B, 408C. In a general case, the orientation of the measurement member fixed axes 704, 706 with respect to the crank-fixed axes 218, 220 may be selected freely in the installation. In this consideration we assume that the x axes 706, 220 and y axes 702, 218, respectively, overlap. In this case we can express the forces as $$F_1 = F \cos(\alpha - 180) \quad (3a)$$

$$F_2 = F \cos(\alpha - 300) \quad (3b)$$

$$F_3 = F \cos(\alpha - 60) \quad (3c)$$

$$F_1 + F_2 + F_3 = 0, \quad (3d)$$

wherein F is the instantaneous arbitrary pedalling force and F1, F2, F3 are the force components measured by the strain gauges 408B, 408C, and 408A, respectively. Angle α is the angle between the instantaneous arbitrary pedalling force 702 and the crank x axis 704. As a result, the tangential and radial forces may be written as $$F_{tan,i} = F_2 + F_3 = F_1 \quad (4a)$$

$$F_{rad,i} = -\frac{1}{\sqrt{3}}(F_1 + 2F_2) = \frac{1}{\sqrt{3}}(F_1 + 2F_3) = \frac{1}{\sqrt{3}}(-F_2 + F_3), \quad (4b)$$

and the total force and the angle may be written as $$F = \frac{-F_1}{\cos(\alpha)} = \frac{F_2 + F_3}{\cos(\alpha)} \quad (5a)$$

$$\alpha = \arctan\left(\frac{-F_2 + F_3}{\sqrt{3}(F_2 + F_3)}\right) = \arctan\left(\frac{-F_1 - 2F_3}{\sqrt{3} F_1}\right). \quad (5b)$$

Equations (4a) through (5b) indicate that the measurement arrangement may provide information on the tangential and radial force components as well as the total pedalling force with the pedalling direction information. Also, the equations indicate the redundancy of the information provided the three force components being measured.

Figure 5:
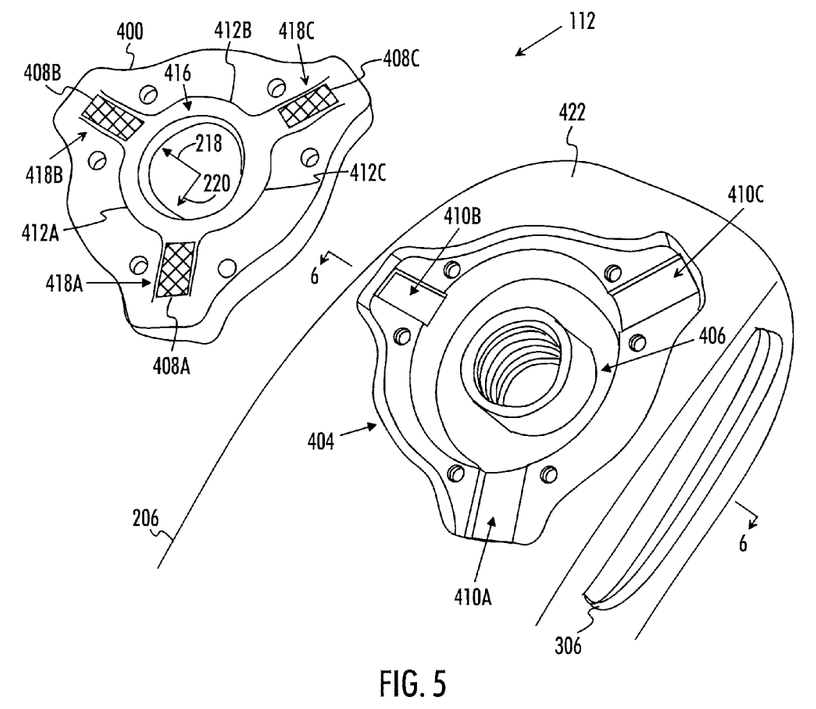
FIG. 5 illustrates an embodiment wherein the apparatus is implemented as an integrated unit utilizing one-sided measurement.

So far, FIGS. 3, 4A and 4B have illustrated embodiments wherein the apparatus 112 is implemented as a separate unit. FIG. 5 illustrates an embodiment wherein the apparatus 112 is implemented as an integrated unit utilizing one-sided measurement. 'Integrated' here refers to the fact that the apparatus 112 is integrated into the crank 206, i.e. they form a uniform piece as shown in FIG. 5. The one-sided measurement described in FIG. 4B is applied as an integrated structure such that the measurement compartment 404 is formed into the body of the crank 206. Other details and the measurement geometry remain. It is to be noted that even if embodiment of FIG. 5 utilizes the separate measurement member 400, also an embodiment like in FIG. 4A is feasible, i.e. no separate measurement member 400 is used but the apparatus 112 of FIG. 4A is integrated into the crank 206.

Figure 6:
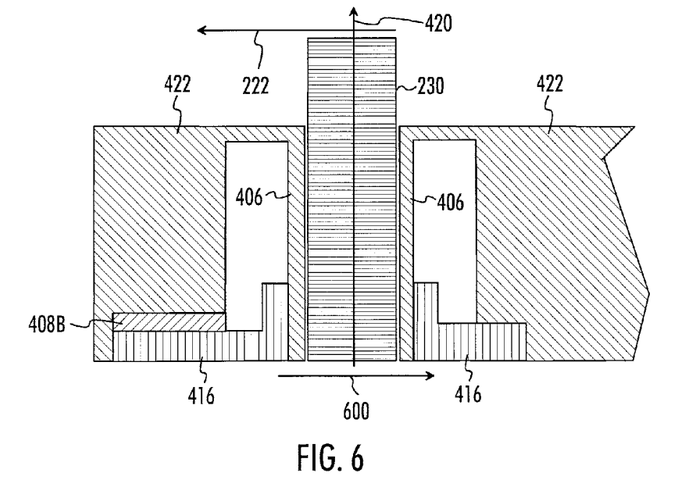
FIGS. 6 and 9 illustrate force consideration of the measurement in a cross-sectional view of the apparatus, wherein FIG. 6 applies to one-sided measurement, and FIG. 9 applies to two-sided measurement.

FIG. 6 illustrates force consideration of the one-sided measurement in a cross-sectional view of the apparatus 112. The sectioning plane is marked in FIG. 5 with reference numeral '6'. The instantaneous pedalling force 222 is applied to the spindle 230, which causes a deformation 600 in the strain member 416, which is measured with the strain gauge 408B. FIG. 6 also illustrates how the portion 406 is surrounded by the hole of the strain member 416.

Figure 8:
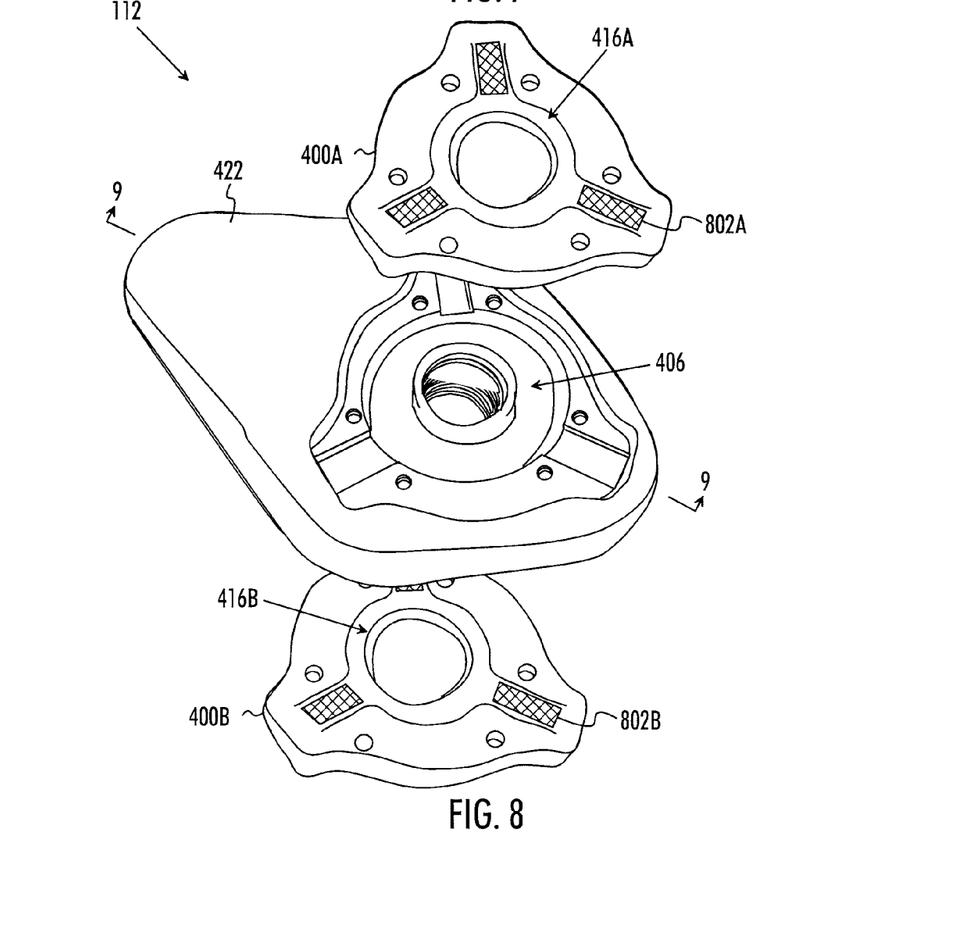
FIG. 8 illustrates an embodiment wherein the apparatus is implemented as an integrated unit utilizing two-sided measurement.

FIG. 8 illustrates an embodiment wherein the apparatus 112 is implemented as an integrated unit utilizing two-sided measurement. The two-sided measurement apparatus 112 may comprise a plurality of strain members 802A, 802B, at least two of which are located in different axial positions of the hole, as shown in FIG. 8. As shown in FIG. 8, the portion 406 is formed into the body 422, and the two strain members 416A, 416B are attached in the measurement members 400A, 400B, which are placed in measurement compartments located at opposite sides of the body 422 of the apparatus 112. Basically, such an apparatus 112 is similar to one-sided measurement apparatuses of FIGS. 3, 4A, 4B and 5 in that that it may either be a separate unit that is attachable to the crank 206 or it may be integrated into the crank 206. Another similarity is that, instead of having two separate measurement members 400A, 400B, one or both of the measurement members 400A, 400B may be formed into the body 422 of the apparatus 112 as in the embodiment of FIG. 4A.

Figure 9:
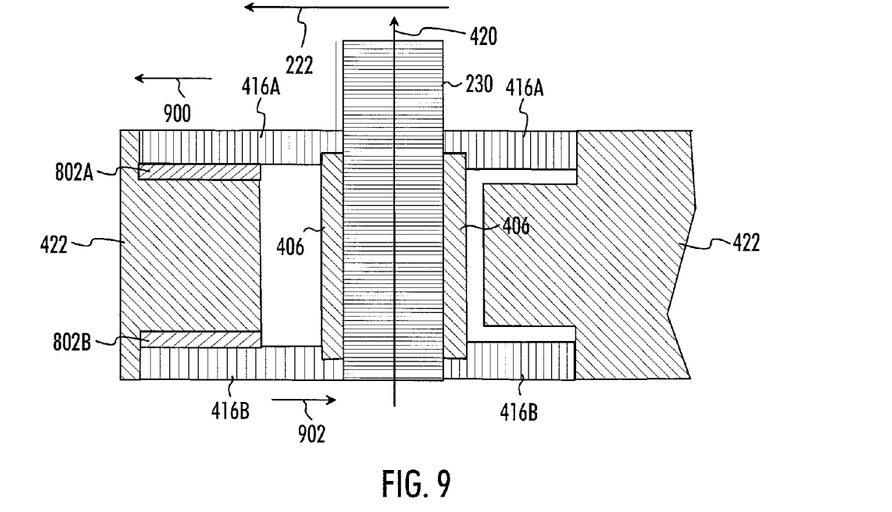

FIG. 9 illustrates force consideration of the two-sided measurement in a cross-sectional view of the apparatus 112. The sectioning plane is marked in FIG. 8 with reference numeral '9'. The instantaneous pedalling force 222 is applied to the spindle 230, which causes two deformations: a first deformation 900 in the strain member 416A, which deformation is measured with the strain gauge 802A, and a second deformation 902 in the strain member 416B, which deformation is measured with the strain gauge 802B.

The advantage of the two-sided measurement is in that the pedalling force to be measured is proportional to the sum of forces measured on either side. The sum is independent on the location of the foot of the cyclist on the pedal, thus reducing the need for calibration.

Figure 10:
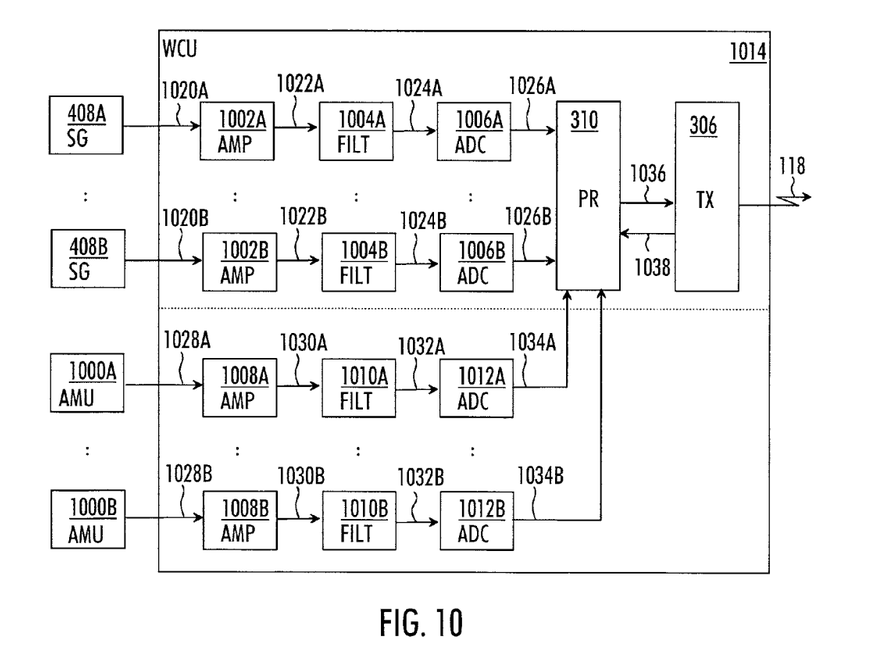
FIG. 10 illustrates an embodiment of a communication unit.

FIG. 10 illustrates an embodiment of a communication unit 1014. The communication unit 1014 receives analog signal 1020A, 1020B from the strain gauge 408A, 408B, which is amplified in the amplifier 1002A, 1002B. The amplified strain gauge signal 1022A, 1022B may be filtered in a (bandpass) filter 1004A, 1004B. The filtered and amplified strain gauge signal 1024A, 1024B is analog-to-digital converted in an ND converter 1006A, 1006B. The digital strain gauge signal 1026A, 1026B is then fed into the processor 310. The processor 310 may perform the appropriate manipulations for the digital strain gauge signal 1026A, 1026B. The resulting pedalling information signal 1036 is fed into the transmitter 306, which transmits the information utilizing the wireless connection 118 to an appropriate receiver (such as the central unit 102 in FIG. 1). If the transmitter 306 is a transceiver, then the communication unit 1014 may also receive control information from another party, and the control information 1038 may be fed to the processor 310 for further processing.

Additionally, the communication unit 1014 may receive crank angle information signal (see FIG. 2 for an explanation of the crank angle 210) 1028A, 1028B from a crank angle measurement unit 1000A, 1000B. The crank angle measurement unit 1000A, 1000B may be implemented, for example, with an accelerometer which measures g force and provides a sinusoidal type signal as a function of the crank angle.

The crank angle information signal 1028A, 1028B may be amplified in an amplifier 1008A, 1008B, and the resulting amplified crank angle information signal 1030A, 1030B may be filtered in a filter 1010A, 1010B. The amplified and filtered crank angle information signal 1032A, 1032B may be analog-to-digital converted in an AD converter 1012A, 1012B into a digital crank angle information signal 1034A, 1034B, which is fed into the processor 310. The digital crank angle information signal 1034A, 1034B may be utilized in connection with the digital stain gauge signal 1026A, 1026B to form pedalling information, as the crank angle 210 information actually determines the exact position of the pedal 208 in its trajectory 228.

Figure 11:
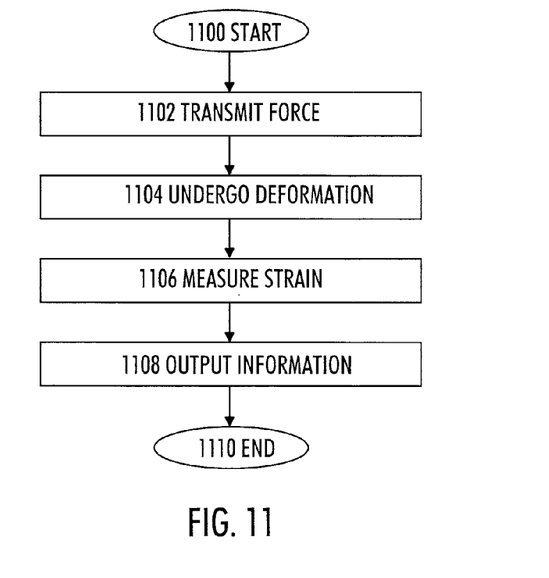
FIG. 11 is a flow-chart illustrating an embodiment of a method.

Next, a method will be described with reference to FIG. 11. Other functions, not described in this application, may also be executed between the operations or within the operations. Some of the operations or parts of the operations may also be left out or replaced by a corresponding operation or part of the operation. The method starts in 1100. In 1102, a force is transmitted from a pedal by means of a spindle of a pedal. In 1104, deformation is undergone by the force. In 1106, an elastic strain representing the deformation is measured. In 1108, information relating to the measured elastic strain is outputted. Operations 1102-1104-1106-1108 may be repeated as long as necessary, whereupon, the method ends in 1110. The embodiments of the apparatus 112 described earlier may also be used to enhance the method.

The best cyclists in sprints may reach power levels close to 1500 Watts, which at a cadence of 100 revolutions per minute requires force peaks of nearly 1800 Newtons. If we examine various embodiments of the apparatus 112 described in the Figures, we note that the portion 406, wherein the spindle 230 will be mounted, is within the centre area of the apparatus 112, i.e. within the middle of the crank 206 or at or near the centreline of the apparatus 112. The portion 406 is totally or at least substantially surrounded by the strain member 416, and both of these are totally or at least substantially surrounded by the body 422. This means that the structure of the apparatus 112 is very reliable: as the portion 406 and the strain member 416 have only a limited movement range in relation to the body 422, a mechanical breakage of the structure is, if not completely excluded, a seldom event. The symmetry of the structure, the use of the strain strips 418A, 418B, 418C positioned evenly or substantially evenly around the hole 304, for example, may also make the structure more durable. Such structure does not allow for the bending of the strain strips 418A, 418B, 418C, but they move in unison with respect to each other, i.e. the mechanical forces affecting the strain strip may be well-controlled already in the design phase and during the actual use of the apparatus 112. The mechanical structure is such that the portion 406, the strain member 416, and the body 422 are one within the other. In other words, the structure is nest of parts. The structure is relatively simple, strong, cheap to manufacture, and the manufacturing tolerances are easy to dimension and manage. The structure may even be easily overdesigned in order to give it a reasonable safety margin.

It will be obvious to a person skilled in the art that, as technology advances, the inventive concept can be implemented in various ways. The invention and its embodiments are not limited to the examples described above but may vary within the scope of the claims.

What is claimed is:

1. An apparatus comprising:
a body comprising a hole for accommodating a spindle of a pedal;
a strain member disposed on the body external to the hole, the strain member undergoing deformation by a force applied on the pedal and transmitted by means of the spindle; and
a strain gauge, coupled with the strain member, to measure an elastic strain representing the deformation.

2. The apparatus of claim 1, wherein the strain gauge is configured to measure the elastic strain in a direction radial to the hole.

3. The apparatus of claim 1, further comprising a body, and the portion is supported from a first axial position of the hole to the body, and the strain member is supported from a second axial position of the hole to the body.

4. The apparatus of claim 1, comprising a plurality of strain members, at least two of which are located in different axial positions of the hole.

5. The apparatus of claim 1, further comprising a body, and the strain member comprises a strain strip, extending from the vicinity of the portion to the vicinity of the body, to receive at least a part of the force and to undergo deformation by the force, and the strain gauge is coupled with the strain strip.

6. The apparatus of claim 5, wherein the strain strip comprises an elongated structure radially extending from the vicinity of the portion to the vicinity of the body, and the strain strip is partly separated from the rest of the strain member by weakening structures.

7. The apparatus of claim 5, wherein the strain member comprises a plurality of strain strips, and at least one strain strip is a dummy strain strip without a coupled strain gauge.

8. The apparatus of claim 5, comprising a plurality of strain strips, a plurality of strain gauges, and a processor configured to form a pedalling parameter from the elastic strains measured by the plurality of the strain gauges.

9. The apparatus of claim 8, wherein the strain strips are positioned in a known configuration with respect to an axis of the hole, and the processor is configured to form a pedalling parameter based on the known configuration and the elastic strains.

10. The apparatus of claim 1, wherein the strain member is force dynamics symmetric with respect to an axis of the hole, and/or a plane along the diameter of the hole.

11. The apparatus of claim 1, wherein the strain member is integrated into a body of the apparatus.

12. The apparatus of claim 1, wherein the portion is integrated into the strain member.

13. The apparatus of claim 1, further comprising a processor configured to form a pedalling parameter by using the elastic strain, and an output device for outputting the pedalling parameter.

14. The apparatus of claim 13, wherein the output device comprises a wireless transmitter, a device interface, a display.

15. The apparatus of claim 1, wherein the apparatus is attachable to a crank, the apparatus is a part of a crank, two apparatuses are attachable to each crank of a crankset, two apparatuses are each part of a crank of a crankset, the apparatus is a part for a bicycle, the apparatus is a bicycle.

16. An apparatus comprising:
  means for accommodating a spindle of a pedal within a hole;
  means for undergoing deformation by a force applied on the pedal and transmitted by means of the spindle, the means for undergoing deformation being disposed on the means for accommodating the spindle of the pedal external to the hole; and
  means for measuring an elastic strain representing the deformation.

17. A method comprising:
  receiving a force from a pedal by means of a spindle associated with the pedal, the spindle being accommodated by a hole in a body;
  undergoing deformation by the force on the body external to the hole;
  measuring an elastic strain representing the deformation on the body by the force external to the hole; and
  outputting information relating to the measured elastic strain.

18. The apparatus of claim 1, wherein the body is attachable to and detachable from a crank arm.

19. The apparatus of claim 1, wherein the body is integrated into a crank arm.

20. The apparatus of claim 19, further comprising a measurement member, the measurement member comprising the strain member, the body comprising a measurement compartment, the measurement member being disposed in the measurement compartment.

21. The apparatus of claim 1, wherein the body is attachable between a crank arm and the spindle.

22. The apparatus of claim 1, wherein the strain member measures elastic strain in a direction radial to the hole.

23. The apparatus of claim 1, wherein the body comprises an attachment hole to enable attachment of the body to a crank arm using an attachment member disposed through the attachment hole.

* * * * *

UNITED STATES PATENT AND TRADEMARK OFFICE
CERTIFICATE OF CORRECTION

PATENT NO. : 8,387,470 B2  
APPLICATION NO. : 12/858832  
DATED : March 5, 2013  
INVENTOR(S) : Esa Tuulari, Risto Nousiainen and Klaus Kansala Page 1 of 1

It is certified that error appears in the above-identified patent and that said Letters Patent is hereby corrected as shown below:

In the Specification

Column 2, line 64:
Now reads: "the portion 416"
Should read: --the portion 406--

Column 5, line 17:
Now reads: "The weakening structure 412A, 412B, 418C"
Should read: --The weakening structure 412A, 412B, 412C--

Column 5, line 23:
Now reads: "418A, 418B, 41C"
Should read: --418A, 418B, 418C--

Signed and Sealed this
Seventeenth Day of September, 2013

Teresa Stanek Rea
*Deputy Director of the United States Patent and Trademark Office*